(12) United States Patent
Hagerman

(10) Patent No.: US 9,770,009 B1
(45) Date of Patent: Sep. 26, 2017

(54) COLLAPSIBLE VESSELS

(71) Applicant: Lowcountry Pet Specialties LLC, Johns Island, SC (US)

(72) Inventor: Johnny E. Hagerman, Johns Island, SC (US)

(73) Assignee: Lowcountry Pet Specialties LLC, Johns Island, SC (US)

( * ) Notice: Subject to any disclaimer, the term of this patent is extended or adjusted under 35 U.S.C. 154(b) by 0 days.

(21) Appl. No.: 15/245,322

(22) Filed: Aug. 24, 2016

(51) Int. Cl.
| | | |
|---|---|---|
| *A01K 7/00* | (2006.01) | |
| *B65D 21/08* | (2006.01) | |
| *B65D 25/02* | (2006.01) | |
| *B29C 70/68* | (2006.01) | |
| *B29K 21/00* | (2006.01) | |
| *B29L 31/00* | (2006.01) | |

(52) U.S. Cl.
CPC ............. *A01K 7/00* (2013.01); *B65D 21/086* (2013.01); *B65D 25/02* (2013.01); *B29C 70/68* (2013.01); *B29K 2021/00* (2013.01); *B29L 2031/712* (2013.01)

(58) Field of Classification Search
CPC .................................. A01K 7/00; A01K 7/005
USPC ............. 119/51.01, 51.5, 52.1, 58, 59, 61.1, 119/61.31, 61.5, 72, 74
See application file for complete search history.

(56) References Cited

U.S. PATENT DOCUMENTS

| | | | |
|---|---|---|---|
| 2,592,638 A * | 4/1952 | Andrew | A01K 39/014 119/61.1 |
| 2,620,006 A | 12/1952 | Sorron-Zabala | |
| 3,434,589 A | 3/1969 | Valtri et al. | |
| 4,890,757 A | 1/1990 | Robbins, III | |
| 5,429,437 A * | 7/1995 | Shaw | F16N 31/006 220/9.2 |
| 5,810,194 A | 9/1998 | Samsel | |
| 5,925,390 A * | 7/1999 | Kornacki | A01K 5/0114 119/51.5 |
| 6,019,244 A * | 2/2000 | Jones | A01K 5/0114 119/61.56 |
| 6,516,748 B1 | 2/2003 | Jackson | |
| 6,736,285 B2 | 5/2004 | Stewart-Stand | |
| 7,308,989 B2 * | 12/2007 | Zheng | E04H 15/40 220/565 |
| 7,654,402 B2 * | 2/2010 | Kusuma | B65D 21/086 220/666 |
| 8,109,234 B1 * | 2/2012 | LeCoq | A01K 5/0128 119/61.5 |
| 8,215,230 B2 * | 7/2012 | Curtin | A47J 43/24 99/495 |
| 9,010,565 B2 | 4/2015 | Warner | |
| 9,346,610 B2 * | 5/2016 | Nelson | B65D 81/2015 |
| 9,386,886 B2 * | 7/2016 | Lee | A47J 47/20 |

* cited by examiner

*Primary Examiner* — Richard Price, Jr.
(74) *Attorney, Agent, or Firm* — Thrive IP®; Jeremy M. Stipkala

(57) ABSTRACT

Collapsible vessels comprising a rubbery material can be folded or scrunched into a small volume, and then spring into a shape suitable for holding water or food such as for a pet.

18 Claims, 7 Drawing Sheets

© 2016 Lowcountry Pet Specialties LLC

© 2016 Lowcountry Pet Specialties LLC

© 2016 Lowcountry Pet Specialties LLC

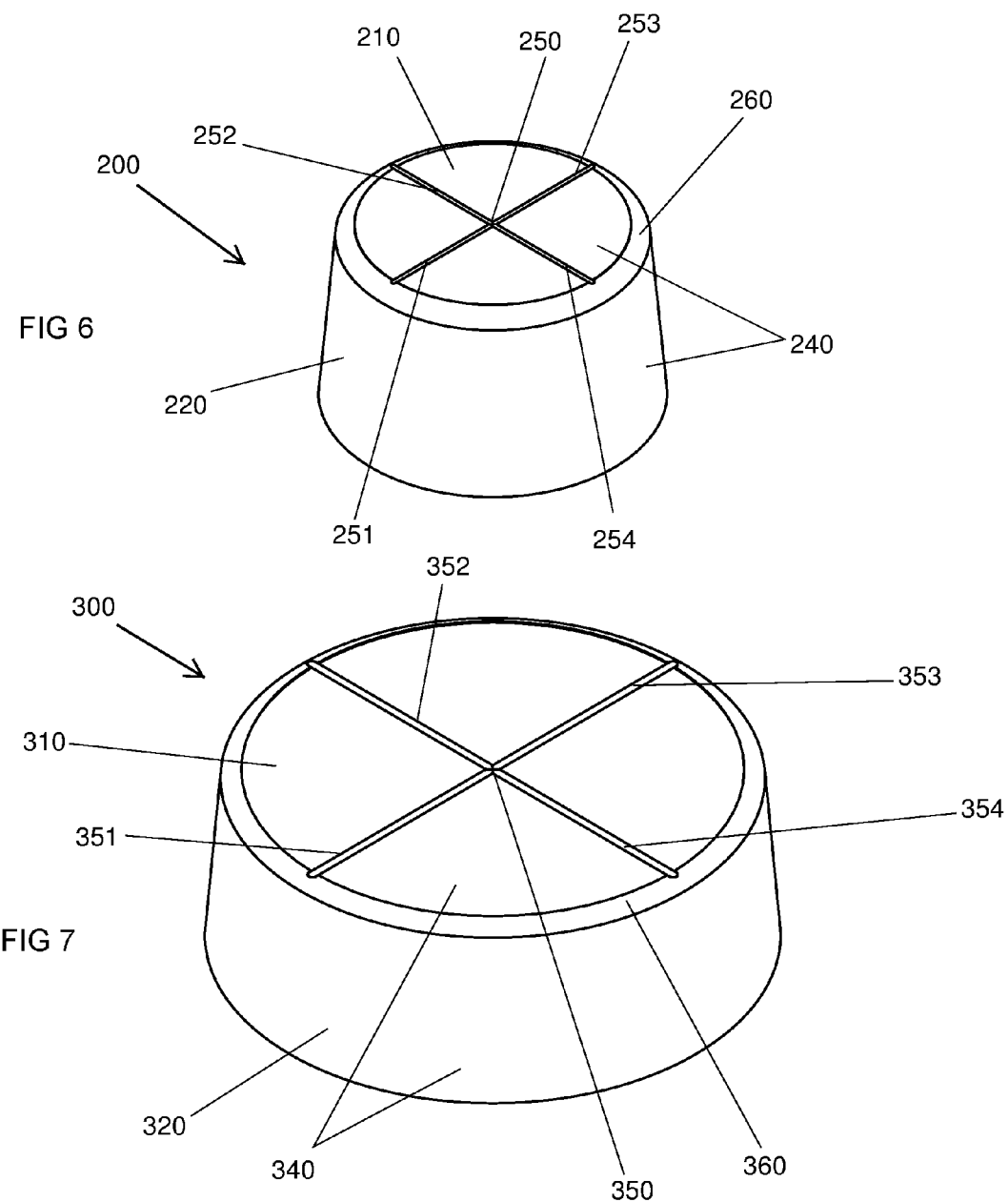

© 2016 Lowcountry Pet Specialties LLC

© 2016 Lowcountry Pet Specialties LLC

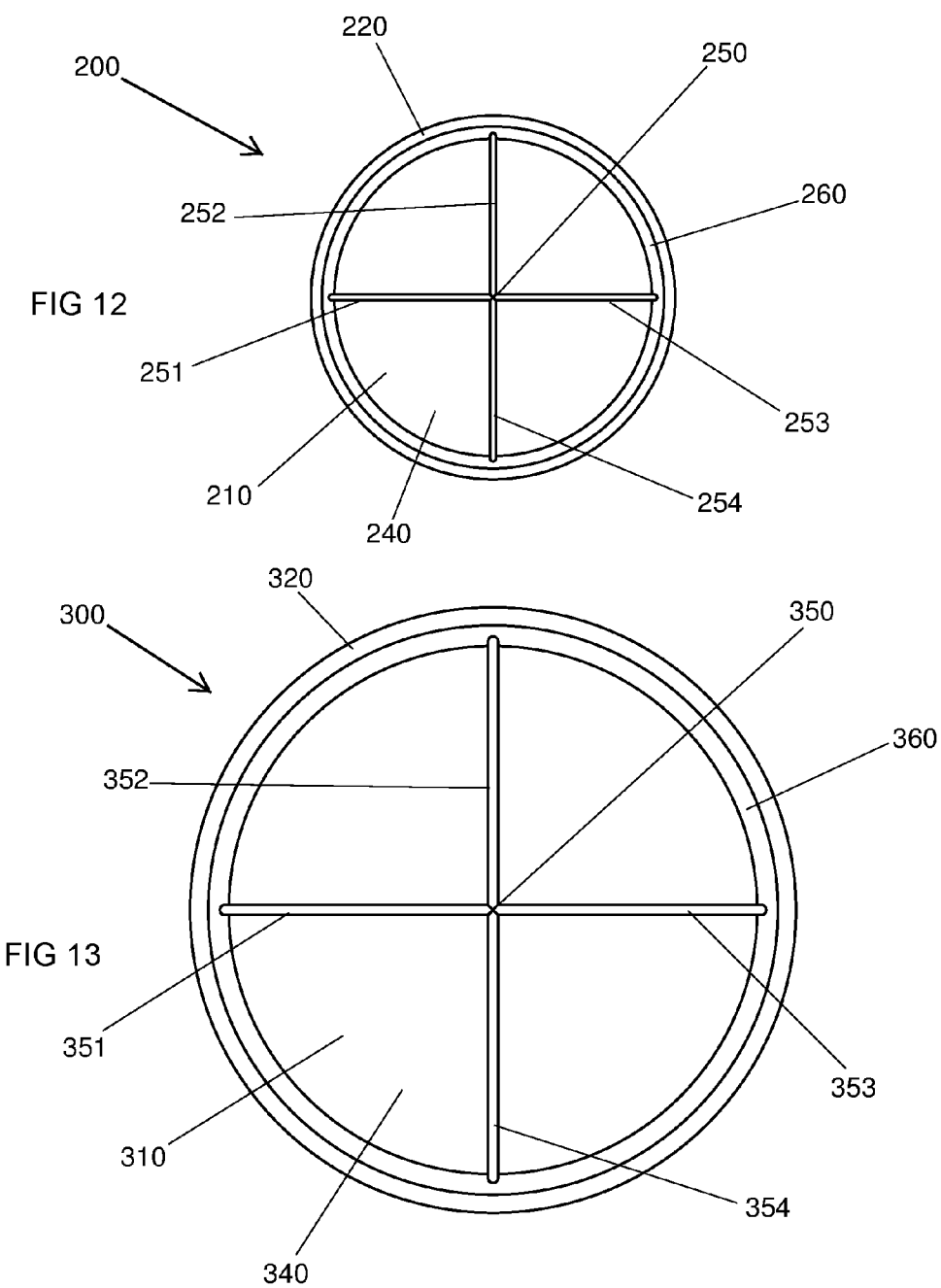

COLLAPSIBLE VESSELS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates to vessels such as water bowls for pets.

BACKGROUND OF THE INVENTION

Dogs are Man's best friend. They go everywhere we do, with rare exception. From professional service dogs, to guide dogs, to the family pet, *Canis familiaris* can be found nearly every place people go. Often, service dogs also go places that are dangerous or impossible for a human to go. It is imperative, for several reasons, to people to provide for the hydration and nutrition needs of domesticated dogs.

Providing for a dog can be made easier if a portable, collapsible vessel or bowl were available. A person walking a dog could attach such a vessel to a water bottle, or stuff the vessel in a pocket. Then, when it is time to feed or water the dog, the vessel can deploy, assuming a shape useful for holding kibble or water. Such a vessel would be especially useful as a water bowl, because dogs are particularly adapted to drinking water by lapping it up against gravity, rather than sipping or gulping as from a cup or bottle, where gravity assists the flow of water. Observing a dog drinking water poured from a bottle reveals significant inefficiency and waste.

Unexpectedly, Applicant has invented collapsible vessels suitable for use as a water bowl or food bowl for a dog or other pet. In some cases, a collapsible vessel according to the present invention can be folded, scrunched, twisted, stuffed, or squashed into a small, portable wad, which will then spring back into a shape suitable for holding water or food when needed for as long as desired.

SUMMARY OF THE INVENTION

Accordingly, some embodiments of the present invention relate to collapsible vessels, one such vessel comprising:
a substantially circular base having a center and a peripheral edge, comprising a plurality of ribs dispersed between the center and the peripheral edge;
a side portion extending substantially perpendicularly from the substantially circular base and attached proximal to the peripheral edge;
wherein the substantially circular base and the side portion define an interior surface for holding a fluid, and an exterior surface;
wherein the collapsible vessel comprises a rubbery material; and
wherein the vessel has a shape that is retained when the vessel is in an uncompressed state.

Other embodiments of the present invention relate to methods of making a collapsible vessel, one such method comprising:
causing a fluid precursor material to enter a mold defining the shape;
curing the fluid precursor material to form the rubbery material;
thereby obtaining the collapsible vessel. In such a method, the substantially circular base and the side portion are one piece.

Further embodiments relate to other methods of making a collapsible vessel, another such method comprising:
causing a first fluid precursor material to enter a base mold defining the substantially circular base having the center and the peripheral edge and the plurality of ribs dispersed between the center and the peripheral edge;
curing the first fluid precursor material to form a first rubbery material, thereby obtaining the substantially circular base;
causing a second fluid precursor material to enter a side portion mold defining the side portion;
curing the second fluid precursor material to form a second rubbery material, thereby obtaining the side portion;
fusing the side portion to the substantially circular base proximal to the peripheral edge,
thereby obtaining the collapsible vessel. In such a method, the substantially circular base and the side portion are formed as two pieces that are then fused together to form the vessel.

While the disclosure provides certain specific embodiments, the invention is not limited to those embodiments. A person of ordinary skill will appreciate from the description herein that modifications can be made to the described embodiments and therefore that the specification is broader in scope than the described embodiments. All examples are therefore non-limiting.

BRIEF DESCRIPTION OF THE DRAWINGS

FIG. 6 depicts collapsible vessel 200 flipped over in a perspective view.

FIG. 7 depicts collapsible vessel 300 flipped over in a perspective view.

FIG. 12 depicts collapsible vessel 200 in a bottom plan view.

FIG. 13 depicts collapsible vessel 300 in a bottom plan view.

DETAILED DESCRIPTION

Figure 1:
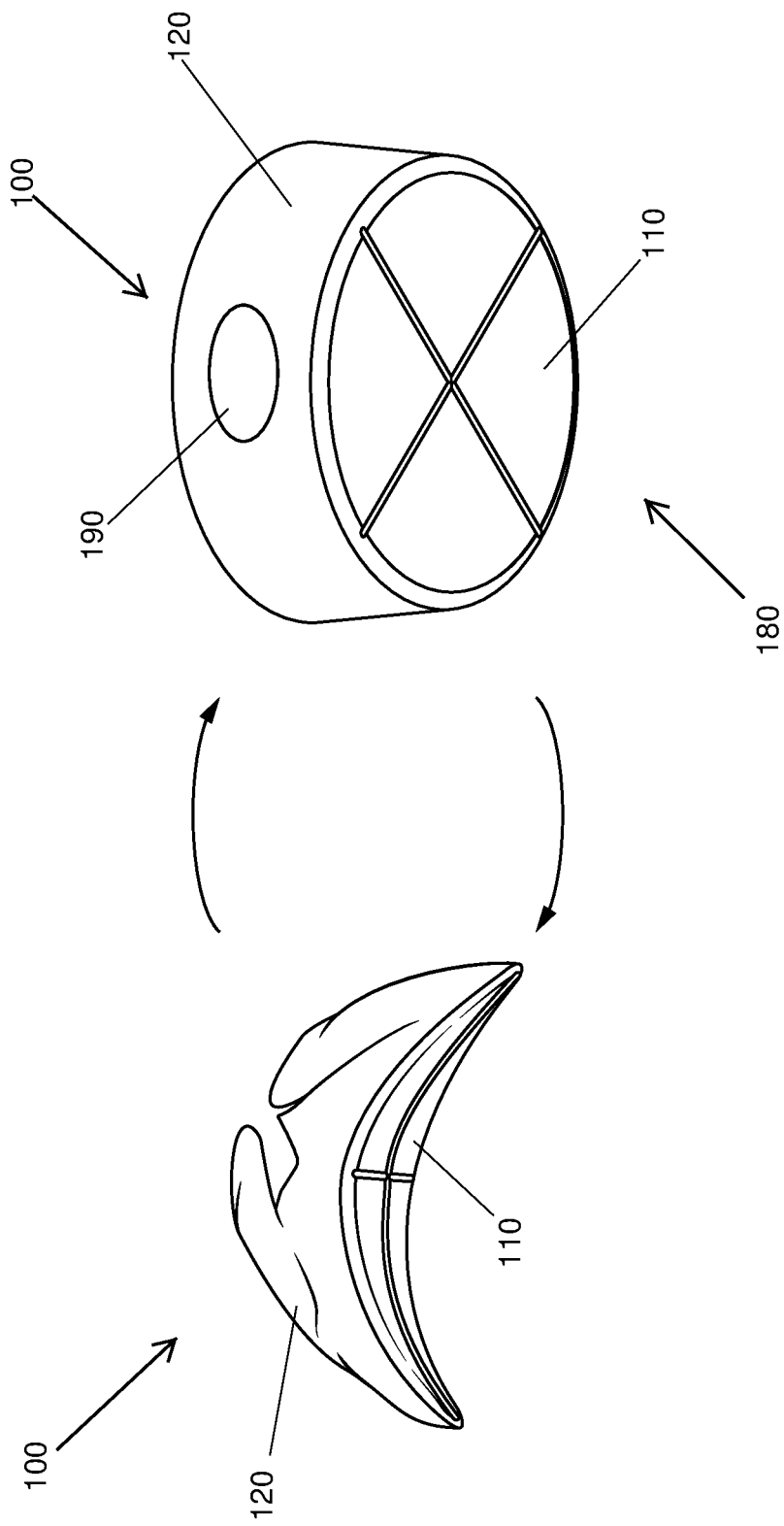
FIG. 1 depicts one embodiment of the invention comprising collapsible vessel 100 collapsed (left) and having shape 180 that is retained when the vessel 100 is in an uncompressed state (right).

As required, detailed embodiments of the present invention are disclosed herein; however, it is to be understood that the disclosed embodiments are merely exemplary of the invention that may be embodied in various forms. The figures are not necessarily to scale, and some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrase "for example," "such as," "including" and the like are used herein, the phrase "and without limitation" is understood to follow unless explicitly stated otherwise. Similarly "an example," "exemplary" and the like are understood to be non-limiting.

The term "substantially" allows for deviations from the descriptor that don't negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

In some embodiments, a collapsible vessel has a base and a side portion. The base can have any suitable shape, such as circular, and can be substantially flat, or can have a third dimension when in an uncompressed state. As used herein, "substantially circular" can indicate circular, oval, or even polygonal. The substantially circular base can have any suitable thickness, such as, for example, 1 mm, 2 mm, 5 mm, 10 mm, or 20 mm. Moreover, the thickness of the base need not be uniform. A plurality of ribs dispersed between the center of the base and the peripheral edge of the base can have any suitable geometry. In some cases, one or more ribs radiate from the center to or toward the edge. In another case, ribs form a spiral pattern. In still another case, ribs can form a grid-like pattern. In yet another case, ribs form concentric circles about the center. The ribs in certain instances impart structural stability to the base and to the vessel, yet allow the vessel and the base to be flexible. A rib can have any suitable dimensions and cross section. A rib can extend from the center all the way to the edge, or only a portion thereof. A rib can pass through the center, extend from the center, or avoid the center entirely. A rib can be straight, curved, angular, or any combination thereof. In some cases, when the vessel rests on a flat surface, one or more ribs contact the flat surface. The plurality of ribs may comprise ribs disposed on the exterior surface, that is, on the bottom or outside of the substantially circular base. Or, the plurality of ribs may comprise ribs disposed on the interior surface, that is, inside the vessel. Or, the plurality of ribs may comprise ribs disposed on the exterior surface and on the interior surface.

The side portion of the vessel extends substantially perpendicularly from the substantially circular base and attaches proximal to the peripheral edge. That means the side portion extends upward from the base, and allows the vessel to hold water, food, or another substance as desired. In certain instances, the side portion has no ribs, while in other instances, the side portion may have ribs.

The substantially circular base and the side portion define an interior surface for holding a fluid, and an exterior surface. Together, the substantially circular base and the side portion achieve a shape that is retained when the vessel is in an uncompressed state, and both the base and the side portion have the flexibility to bend and fold into any desired smaller volume. That shape can represent any suitable shape, such as, for example, an open-top cylinder. It can be advantageous, in some embodiments of the vessel, for the sides to be just sturdy enough to maintain their shape when filled with water, but collapse if the vessel is lifted to be poured. In other embodiments, the side portion is sturdy enough for the vessel full of water to be lifted and poured without the side portion collapsing and spilling water. The side portion, therefore, can be of any suitable thickness and flexibility. For example, the side portion can have a thickness of 1 mm, 2 mm, 5 mm, 10 mm, or 20 mm.

Additional embodiments provide collapsible vessels further comprising a plurality of side ribs disposed on the side portion. Such side ribs can offer additional structural support for the side portions, while retaining significant flexibility so the vessel can be folded, bent, and scrunched into a smaller volume for storage and portability. Any suitable geometry can be used for the plurality of side ribs. For example, in some cases, the plurality of side ribs comprises side ribs arrayed substantially perpendicularly to the substantially circular base. In other cases, the plurality of side ribs may comprise side ribs arrayed at an angle other than 90° to the substantially circular base. The side ribs may be straight, curved, angular, or a combination thereof. In addition, the plurality of side ribs may comprise side ribs disposed on the exterior surface, side ribs disposed on the interior surface, or a combination thereof.

A collapsible vessel can be made of any suitable rubbery material. Such a rubbery material may be, for example, tear-resistant, flexible enough to bend, fold, and scrunch, and yet resilient enough to retain a shape in an uncompressed state sufficient to hold a volume of water or an amount of kibble or other food. In some cases, the rubbery material comprises natural vulcanized rubber, synthetic rubber, or a combination thereof. In further cases, the rubbery material comprises ethylene propylene diene monomer-derived synthetic rubber, styrene butadiene, polychloroprene, polyurethane, styrene ethylene butylene styrene copolymer, or a combination thereof. It may be pointed out that certain instances do not include any metal, wood, stone, or inflexible plastic. Other instances allow for a reinforcing structure, or decoration, or both, provided by metal, wood, stone, ceramic, or inflexible plastic, or a combination thereof. The collapsible vessel of certain embodiments contains a rubbery material that is suitable for contacting a fluid to be consumed by a mammal. That means that the fluid to be consumed does not leech or transport from the rubbery material to the mammal one or more substances that would be toxic to the mammal, or in amounts that would be toxic to the mammal. In some cases, that would mean the interior surface, at least, comprises a rubbery material that is "food-safe." Among other suitable rubbery materials, ethylene propylene diene monomer-derived synthetic rubber may be mentioned in particular.

The rubbery material can have any suitable physical properties. For example, tensile strength can be less than 100 pounds per square inch, 100 pounds per square inch, 500 pounds per square inch, 1,000 pounds per square inch, 2,000 pounds per square inch, 5,000 pounds per square inch, or greater than 5000 pounds per square inch. In some cases, tensile strength ranges from about 500 pounds per square inch to 2,000 pounds per square inch, or is about 1,000 pounds per square inch. Elongation at break or onset of plastic deformation can be less than 100%, 100%, 200%, 300%, 400%, or greater than 400%. In certain instances, elongation ranges from about 200% to about 400%, or is about 300%.

A collapsible vessel may further comprise at least one decorative impression. A decorative impression comprises an area of the side portion, for example, that contains a color, a design, lettering, a picture, or any suitable artwork. The decorative impression can be printed on the collapsible vessel, molded into the material of the vessel, or fused onto the vessel such as with glue or other adhesive after the vessel has been molded and cured. Any suitable material can be used for the decorative impression. In some cases, the decorative impression comprises an additional rubbery material different from the rubbery material of the collapsible vessel. In other cases, the decorative impression comprises an adhesive-backed thin film (a "sticker") applied to the exterior surface of the side portion, for example.

Other embodiments of the present invention relate to methods of making a collapsible vessel. Any suitable method can be used to make a collapsible vessel, employing known techniques and yet-to-be-developed techniques. One such method comprises causing a fluid precursor material to enter a mold defining the shape;
curing the fluid precursor material to form the rubbery material;
thereby obtaining the collapsible vessel. Any suitable fluid precursor material can be used. For example, molten elastomerized thermoplastic can flow into a mold having the desired shape of the vessel in an uncompressed state. Alternatively, unvulcanized natural rubber, one or more monomers, and synthetic rubber precursors, alone or in combination, can be introduced into the mold, and then cured such as by heating at a suitable temperature for a suitable time, such as is known in the art. Mold release agents and other additives can be employed.

Further embodiments relate to other methods of making a collapsible vessel, another such method comprising:

causing a first fluid precursor material to enter a base mold defining the substantially circular base having the center and the peripheral edge and the plurality of ribs dispersed between the center and the peripheral edge;
curing the first fluid precursor material to form a first rubbery material, thereby obtaining the substantially circular base;
causing a second fluid precursor material to enter a side portion mold defining the side portion;
curing the second fluid precursor material to form a second rubbery material, thereby obtaining the side portion;
fusing the side portion to the substantially circular base proximal to the peripheral edge, thereby obtaining the collapsible vessel. The first rubbery material and the second rubbery material can be the same or different, and both employ any suitable rubbery material such as those described herein.

When desired, a decorative impression can be introduced to the collapsible vessel according to any suitable method. In some cases, a decorative impression can be included in the mold of the vessel. Sometimes, a mold can comprise a removable portion that forms the decorative impression, so that different vessels can easily be formed with different decorative impressions. Color can be imparted to the decorative impression in a suitable manner. For example, a colorant can be introduced into the mold at the decorative impression. Or, paint, ink, or an adhesive-backed thin film ("a sticker") can be applied after molding and curing.

Collapsible vessels of the present invention can be used in any suitable manner. For example, a collapsible vessel can be folded and scrunched, and bound to a plastic water bottle such as by a rubber band or cord, and accompany a person and her dog on a walk. At some point in the walk, the collapsible vessel can be unbound from the bottle, deployed on the ground where the vessel assumes its uncompressed shape, and water from the bottle can be poured into the vessel for the dog to drink. When the dog is finished, the water could be poured out, the vessel folded, scrunched, and bound to the bottle again for the walk to resume.

DETAILED DESCRIPTION OF THE DRAWINGS

Further embodiments of the present invention can be described by reference to the accompanying drawings, which can be entitled collectively as "FIG. 1 to FIG. 13." Items labeled with the same number are the same item in the several drawings.

FIG. 1 depicts one embodiment of the invention comprising collapsible vessel 100 collapsed (left) and having shape 180 that is retained when the vessel 100 is in an uncompressed state (right). The substantially circular base 110 and side portion 120 are shown to have the flexibility to be repeatedly folded, squashed, and bent into a compressed state (left), but then spring back into shape 180 when vessel 100 is released (right). Decorative impression 190 is also visible on side portion 120.

Figure 2:
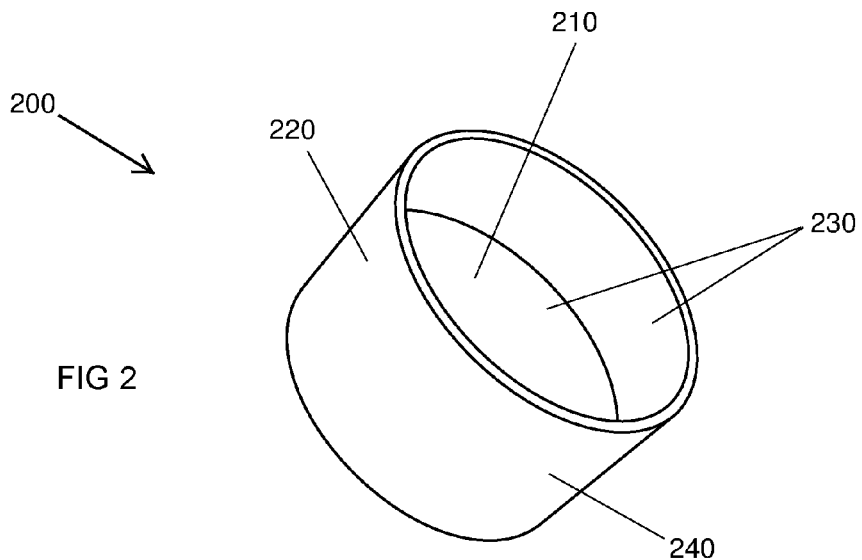
FIG. 2 depicts another embodiment comprising collapsible vessel 200 in a perspective view.
Figure 4:
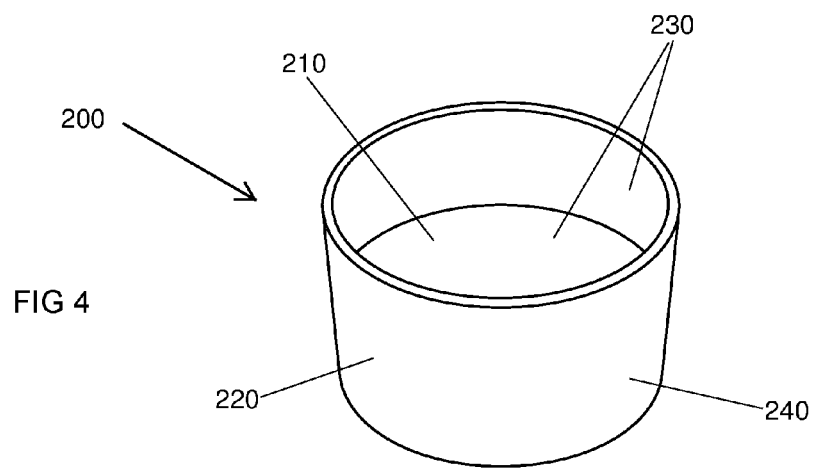
FIG. 4 depicts collapsible vessel 200 in a front perspective view.

FIG. 2 depicts another embodiment comprising collapsible vessel 200 in a perspective view. Side portion 220 extends substantially perpendicularly from substantially circular base 210, and both comprise a rubbery material. Substantially circular base 210 and side portion 220 define an interior surface 230 for holding a fluid, and an exterior surface 240. FIG. 4 depicts collapsible vessel 200 in a front perspective view.

Figure 3:
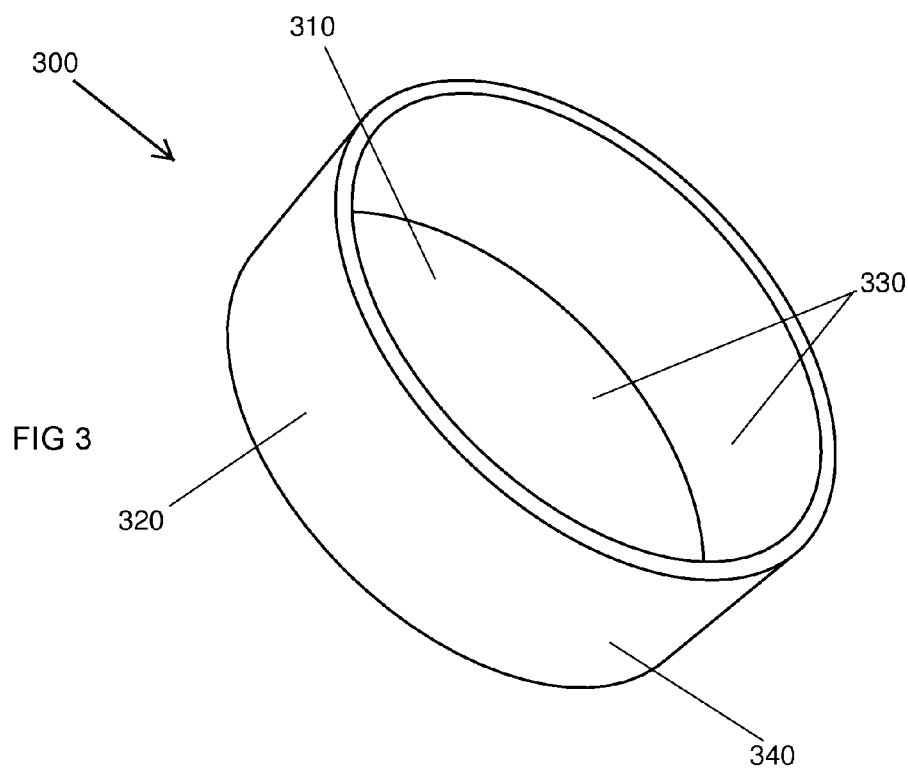
FIG. 3 depicts another embodiment comprising collapsible vessel 300 in a perspective view.
Figure 5:
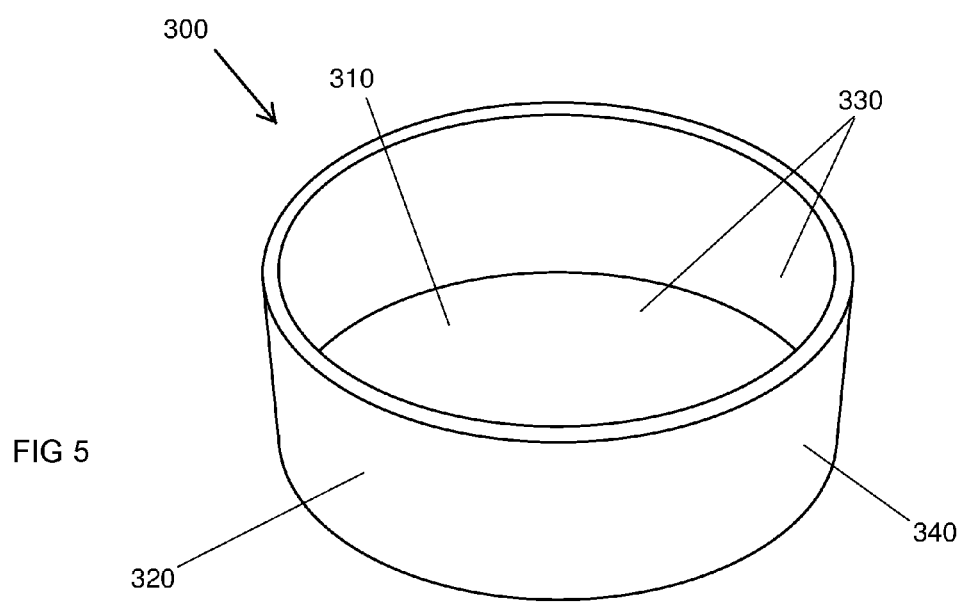
FIG. 5 depicts collapsible vessel 300 in a front perspective view.

FIG. 3 depicts another embodiment comprising collapsible vessel 300 in a perspective view. Side portion 320 extends substantially perpendicularly from substantially circular base 310, and both comprise a rubbery material. Substantially circular base 310 and side portion 320 define an interior surface 330 for holding a fluid, and an exterior surface 340. FIG. 5 depicts collapsible vessel 300 in a front perspective view.

FIG. 6 depicts collapsible vessel 200 flipped over in a perspective view. Substantially circular base 210 comprises center 250 and peripheral edge 260. A plurality of ribs 251, 252, 253, 254 are dispersed between the center 250 and the peripheral edge 260. Side portion 220 extends substantially perpendicularly from the substantially circular base 210 and is attached proximal to the peripheral edge 260. Here, it can be seen that substantially circular base 210 and the side portion 220 define an exterior surface 240. Peripheral edge 260 can be any suitable shape. Here, peripheral edge 260 is shown having a rounded bezel between substantially circular base 210 and the side portion 220. In other instances of the present invention, substantially circular base 210 can meet the side portion 220 in a more abrupt fashion, for example. In still further instances, substantially circular base 210 can extend past side portion 220.

FIG. 7 depicts collapsible vessel 300 flipped over in a perspective view. Substantially circular base 310 comprises center 350 and peripheral edge 360. A plurality of ribs 351, 352, 353, 354 are dispersed between the center 350 and the peripheral edge 360. Side portion 320 extends substantially perpendicularly from the substantially circular base 310 and is attached proximal to the peripheral edge 360. Here, it can be seen that substantially circular base 310 and the side portion 320 define an exterior surface 340. Peripheral edge 360 can be any suitable shape. Here, peripheral edge 360 is shown having a rounded bezel between substantially circular base 310 and the side portion 320. In other instances of the present invention, substantially circular base 310 can meet the side portion 320 in a more abrupt fashion, for example. In still further instances, substantially circular base 310 can extend past side portion 320.

Figure 8:
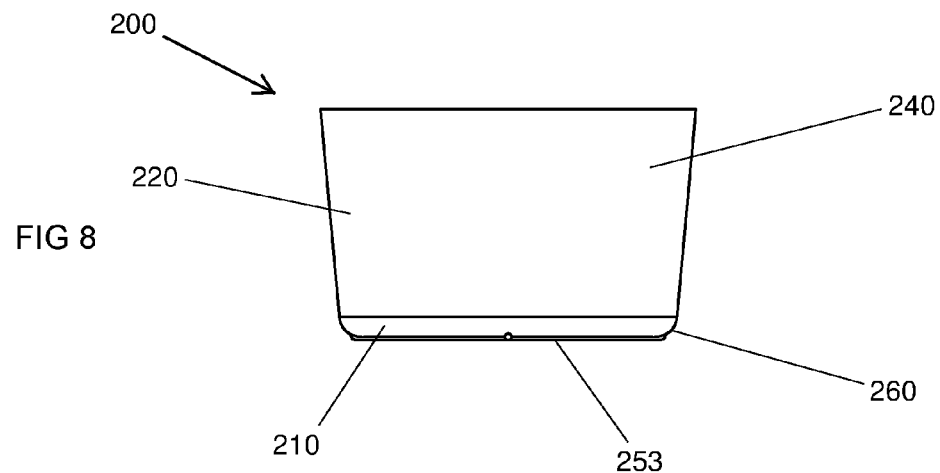
FIG. 8 depicts collapsible vessel 200 in a front elevation view. Left side, right side, and rear elevation views are identical.

FIG. 8 depicts collapsible vessel 200 in a front elevation view. Left side, right side, and rear elevation views are identical, except rib 253 will appear in different positions as collapsible vessel 200 is rotated through those elevation views.

Figure 9:
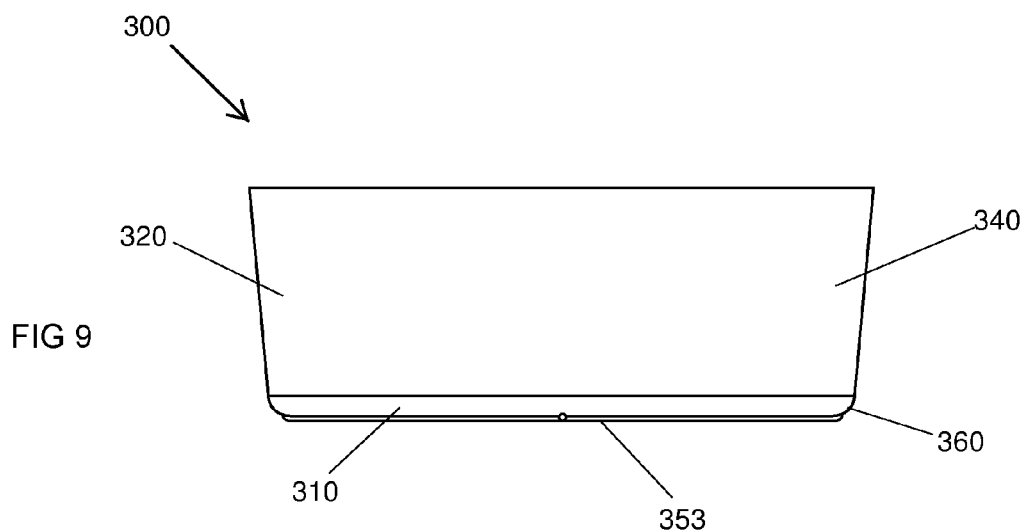
FIG. 9 depicts collapsible vessel 300 in a front elevation view. Left side, right side, and rear elevation views are identical.

FIG. 9 depicts collapsible vessel 300 in a front elevation view. Left side, right side, and rear elevation views are identical, except rib 353 will appear in different positions as collapsible vessel 200 is rotated through those elevation views.

Figure 10:
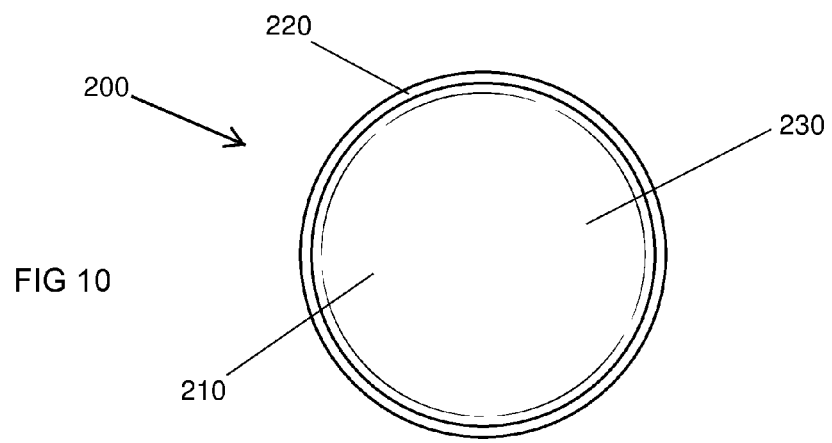
FIG. 10 depicts collapsible vessel 200 in a top plan view.

FIG. 10 depicts collapsible vessel 200 in a top plan view. Interior surface 230, suitable for holding a fluid or kibble, can be seen.

Figure 11:
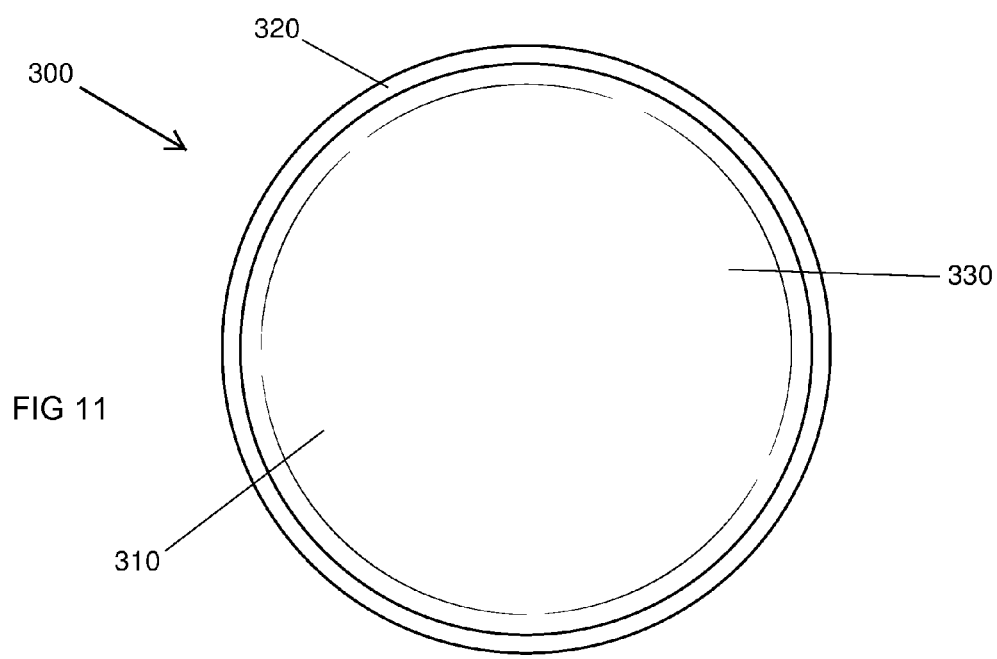
FIG. 11 depicts collapsible vessel 300 in a top plan view.

FIG. 11 depicts collapsible vessel 300 in a top plan view. Interior surface 330, suitable for holding a fluid or kibble, can be seen.

FIG. 12 depicts collapsible vessel 200 in a bottom plan view. Here, it can be seen that the plurality of ribs 251, 252, 253, 254, are disposed on the exterior surface 240.

FIG. 13 depicts collapsible vessel 300 in a bottom plan view. Here, it can be seen that the plurality of ribs 351, 352, 353, 354, are disposed on the exterior surface 340.

EMBODIMENTS

Embodiment 1

A collapsible vessel, comprising:
a substantially circular base having a center and a peripheral edge, comprising a plurality of ribs dispersed between the center and the peripheral edge;
a side portion extending substantially perpendicularly from the substantially circular base and attached proximal to the peripheral edge;
wherein the substantially circular base and the side portion define an interior surface for holding a fluid, and an exterior surface;
wherein the collapsible vessel comprises a rubbery material; and
wherein the vessel has a shape that is retained when the vessel is in an uncompressed state.

Embodiment 2

The collapsible vessel of embodiment 1, wherein the plurality of ribs comprises ribs disposed on the exterior surface.

Embodiment 3

The collapsible vessel of any one of embodiments 1-2, wherein the plurality of ribs comprise ribs disposed on the interior surface.

Embodiment 4

The collapsible vessel of any one of embodiments 1-3, further comprising a plurality of side ribs disposed on the side portion.

Embodiment 5

The collapsible vessel of embodiment 4, wherein the plurality of side ribs comprise side ribs arrayed substantially perpendicularly to the substantially circular base.

Embodiment 6

The collapsible vessel of any one of embodiments 4-5, wherein the plurality of side ribs comprises side ribs disposed on the exterior surface.

Embodiment 7

The collapsible vessel of any one of embodiments 4-6, wherein the plurality of side ribs comprises side ribs disposed on the interior surface.

Embodiment 8

The collapsible vessel of any one of embodiments 1-7, wherein the rubbery material comprises natural vulcanized rubber, synthetic rubber, or a combination thereof.

Embodiment 9

The collapsible vessel of embodiment 8, wherein the rubbery material comprises ethylene propylene diene monomer-derived synthetic rubber, styrene butadiene, polychloroprene, polyurethane, styrene ethylene butylene styrene copolymer, or a combination thereof.

Embodiment 10

The collapsible vessel of any one of embodiments 1-9, wherein the rubbery material has a tensile strength of about 1,000 pounds per square inch.

Embodiment 11

The collapsible vessel of any one of embodiments 1-10, wherein the rubbery material has an elongation of about 300%.

Embodiment 12

The collapsible vessel of any one of embodiments 1-11, further comprising at least one decorative impression.

Embodiment 13

The collapsible vessel of embodiment 12, wherein the decorative impression comprises an additional rubbery material different from the rubbery material of the collapsible vessel.

Embodiment 14

The collapsible vessel of any one of embodiments 1-13, wherein the rubbery material is suitable for contacting a fluid to be consumed by a mammal.

Embodiment 15

A method of making the collapsible vessel of any one of embodiments 1-14, comprising:
causing a fluid precursor material to enter a mold defining the shape;
curing the fluid precursor material to form the rubbery material; thereby obtaining the collapsible vessel.

Embodiment 16

A method of making the collapsible vessel of any one of embodiments 1-14, comprising:
causing a first fluid precursor material to enter a base mold defining the substantially circular base having the center and the peripheral edge and the plurality of ribs dispersed between the center and the peripheral edge;
curing the first fluid precursor material to form a first rubbery material, thereby obtaining the substantially circular base;
causing a second fluid precursor material to enter a side portion mold defining the side portion;
curing the second fluid precursor material to form a second rubbery material, thereby obtaining the side portion;
fusing the side portion to the substantially circular base proximal to the peripheral edge,
thereby obtaining the collapsible vessel.

As previously stated, detailed embodiments of the present invention are disclosed herein; however, it is to be understood that the disclosed embodiments are merely exemplary of the invention that may be embodied in various forms. It will be appreciated that many modifications and other variations stand within the intended scope of this invention as claimed below. Furthermore, the foregoing description of various embodiments does not necessarily imply exclusion. For example, "some" embodiments may include all or part of "other" and "further" embodiments within the scope of this invention. In addition, "a" does not mean "one and only one;" "a" can mean "one and more than one."

I claim:
1. A collapsible vessel, comprising:
a substantially circular base having a center and a peripheral edge, comprising a plurality of ribs extending from the center to the peripheral edge;
a side portion extending substantially perpendicularly from the substantially circular base and attached proximal to the peripheral edge;
wherein the substantially circular base and the side portion define a single interior surface for holding a fluid, and an exterior surface;
wherein the plurality of ribs consists of ribs disposed on the single interior surface, and the plurality of ribs have a height that is less than a thickness of the substantially circular base;
wherein the collapsible vessel does not comprise any metal, wood, stone, or inflexible plastic;
wherein the collapsible vessel consists essentially of a rubbery material; and
wherein the vessel has a shape that is retained when the vessel is in an uncompressed state.
2. The collapsible vessel of claim 1, further comprising a plurality of side ribs disposed on the side portion.
3. The collapsible vessel of claim 2, wherein the plurality of side ribs comprise side ribs arrayed substantially perpendicularly to the substantially circular base.
4. The collapsible vessel of claim 2, wherein the plurality of side ribs comprises side ribs disposed on the exterior surface.
5. The collapsible vessel of claim 2, wherein the plurality of side ribs comprises side ribs disposed on the single interior surface.
6. The collapsible vessel of claim 1, wherein the rubbery material comprises natural vulcanized rubber, synthetic rubber, or a combination thereof.
7. The collapsible vessel of claim 6, wherein the rubbery material comprises ethylene propylene diene monomer-derived synthetic rubber, styrene butadiene, polychloroprene, polyurethane, styrene ethylene butylene styrene copolymer, or a combination thereof.
8. The collapsible vessel of claim 1, wherein the rubbery material has a tensile strength of about 1,000 pounds per square inch.
9. The collapsible vessel of claim 1, wherein the rubbery material has an elongation of about 300%.
10. The collapsible vessel of claim 1, further comprising at least one decorative impression.
11. The collapsible vessel of claim 10, wherein the decorative impression comprises an additional rubbery material different from the rubbery material of the collapsible vessel.
12. The collapsible vessel of claim 1, wherein the rubbery material is suitable for contacting a fluid to be consumed by a mammal.
13. A method of making the collapsible vessel of claim 1, comprising:
causing a fluid precursor material to enter a mold defining the shape;
curing the fluid precursor material to form the rubbery material;
thereby obtaining the collapsible vessel.

14. A method of making the collapsible vessel of claim 1, comprising:
- causing a first fluid precursor material to enter a base mold defining the substantially circular base having the center and the peripheral edge and the plurality of ribs dispersed between the center and the peripheral edge;
- curing the first fluid precursor material to form a first rubbery material, thereby obtaining the substantially circular base;
- causing a second fluid precursor material to enter a side portion mold defining the side portion;
- curing the second fluid precursor material to form a second rubbery material, thereby obtaining the side portion;
- fusing the side portion to the substantially circular base proximal to the peripheral edge;
- wherein the first rubbery material and the second rubbery material consist essentially of the rubbery material;
- thereby obtaining the collapsible vessel.

15. The collapsible vessel of claim 1, wherein the collapsible vessel consists of a single rubbery material.

16. The collapsible vessel of claim 1, wherein the shape is an open-top cylinder.

17. The collapsible vessel of claim 1, adapted to maintain the shape when the collapsible vessel is filled with water.

18. The collapsible vessel of claim 1, adapted to be lifted and poured without the side portion collapsing when the collapsible vessel is filled with water.

\* \* \* \* \*